United States Patent
Naik et al.

(10) Patent No.: US 9,706,448 B2
(45) Date of Patent: Jul. 11, 2017

(54) SELECTIVE DUAL NETWORK MODE FOR LTE DEVICES

(71) Applicant: Apple Inc., Cupertino, CA (US)

(72) Inventors: Anil G. Naik, San Jose, CA (US); Giri Prassad Deivasigamani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/726,346

(22) Filed: May 29, 2015

(65) Prior Publication Data

US 2016/0353330 A1    Dec. 1, 2016

(51) Int. Cl.
*H04W 36/00* (2009.01)
*H04L 29/06* (2006.01)
*H04W 36/30* (2009.01)
*H04W 88/06* (2009.01)
*H04W 48/18* (2009.01)

(52) U.S. Cl.
CPC ..... *H04W 36/0022* (2013.01); *H04L 65/1016* (2013.01); *H04W 36/30* (2013.01); *H04W 48/18* (2013.01); *H04W 88/06* (2013.01)

(58) Field of Classification Search
CPC ..... H04W 36/30; H04W 36/18; H04W 36/08; H04W 36/32
USPC .......................................................... 455/437
See application file for complete search history.

(56) References Cited

U.S. PATENT DOCUMENTS

| | | | | |
|---|---|---|---|---|
| 2011/0051701 A1* | 3/2011 | Cai | ..................... | H04L 65/1016 370/338 |
| 2013/0034080 A1* | 2/2013 | Yang | ................. | H04W 36/0055 370/331 |
| 2013/0201890 A1* | 8/2013 | Swaminathan | ....... | H04W 88/06 370/311 |
| 2014/0078898 A1* | 3/2014 | Anchan | ............. | H04W 28/0268 370/230 |
| 2014/0126544 A1* | 5/2014 | Khay-Ibbat | ........... | H04W 36/30 370/332 |
| 2015/0003411 A1* | 1/2015 | Sandhu | ............. | H04W 36/0022 370/331 |

* cited by examiner

*Primary Examiner* — William Nealon
(74) *Attorney, Agent, or Firm* — Downey Brand LLP

(57) ABSTRACT

A voice over Long Term Evolution (VoLTE) capable mobile device is configured to deregister from an Internet Protocol (IP) Multimedia Subsystem (IMS) network element for voice connections and use a dual network mode of operation that includes data connections via a 4G LTE/LTE-A network and voice connections via a legacy 3G or 2G network based on performance metrics a serving cell of the 4G LTE/LTE-A network. When the performance metrics indicate that voice connections may be unstable, such as when a reference signal received power (RSRP) falls below a threshold level but remains above a reselection/handover threshold level, the mobile device deregisters from the IMS network element to disable VoLTE connections from being established. The mobile device establishes the requested voice connection via a legacy 3G or 2G network instead, while established or new data connections for the mobile device continue to use the 4G LTE/LTE-A network.

18 Claims, 8 Drawing Sheets

SELECTIVE DUAL NETWORK MODE FOR LTE DEVICES

TECHNICAL FIELD

The described embodiments generally relate to wireless communications, including, methods and apparatus for selective dual network mode of operation for wireless devices.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. Many different types of 4G LTE-compliant communication devices have been introduced into the consumer electronic device marketplace. Some LTE/LTE-A wireless networks offer high data services and packetized voice service, e.g., voice over LTE (VoLTE). Some 4G wireless communication devices are capable of communicating within heterogeneous telecommunication networks that employ a diverse mixture of 4G, third generation (3G), and second generation (2G) RAT systems. Accordingly, these multi-mode communication devices are configured with radio frequency (RF) circuitry that allows the devices to readily transition between LTE/LTE-A network cells, as well as to roam amongst and transition between various 3G and 2G legacy network cells. By way of example, 3G legacy RATs may include Universal Mobile Telecommunications System (UMTS)/High Speed Packet Access (HSPA) and Code Division Multiple Access (CDMA) 2000/1× Evolution-Data Only (1× EV-DO) systems, whereas 2G legacy RATs can include Global System for Mobile Communications (GSM)/Enhanced Data Rate for GSM Evolution (EDGE) systems.

Additionally, 4G multi-mode communication devices can be configured to perform different voice calling functions using a packet-based VoLTE communication protocol or a circuit-switched 3G or 2G legacy communication protocol. The choice of which voice communication protocol the mobile device uses depends on what RATs are available to the device at its present network location. For instance, when a multi-mode communication device operates within a coverage area of an LTE/LTE-A network cell, the device can be configured to initiate a voice call using a VoLTE communications protocol, when the LTE/LTE-A network cell supports VoLTE calls. In another scenario, when the same device operates within a coverage area of a 3G or 2G legacy network cell and LTE network access is otherwise unavailable, the multi-mode communication device may be configured to initiate a voice call using a legacy circuit-switched communications protocol, such as through a 3G or 2G legacy network cell.

Generally, multi-mode communication devices are configured to prefer communication via 4G LTE networks offering relatively high data-rate throughput, as opposed to, communication via 3G or 2G legacy wireless networks that offer substantially lower data-rate throughput. For voice connections, however, higher data-rates may not be necessary as voice calls are typically low-bandwidth, periodic communications. Accordingly, in certain scenarios, such as when an LTE/LTE-A network cell may be providing a lower quality channel or experiencing congested network conditions, it may be more efficient for a mobile device to establish a voice call using a network cell with reliable radio coverage at the device's present location, as opposed to establishing the voice call using a network cell that employs a 4G RAT (offering a higher data-rate throughput) but has less reliable radio coverage at the device's current location. This scenario may exist when a multi-mode communication device operates within, or is moving into, a cell edge region of an LTE network cell, where one or more overlapping 3G or 2G network cell(s) can offer the multi-mode communication device more reliable voice service.

Accordingly, there is a need for selecting different network modes of operation for a wireless communication device to provide for stable voice communications via VoLTE-compliant LTE/LTE-A networks or legacy 3G/2G wireless networks based on network conditions in which the wireless communication device operates.

SUMMARY

A voice over Long Term Evolution (VoLTE) capable mobile device is configured to deregister from an Internet Protocol (IP) Multimedia Subsystem (IMS) network element for voice connections and instead use a dual network mode of operation that includes data connections via a 4G LTE/LTE-A network and voice connections via a legacy 3G or 2G network based on performance metrics for one or more cells of the 4G LTE/LTE-A network in which the mobile device operates. When the performance metrics indicate that connections may be unstable, such as when received signal power falls below a threshold level, the mobile device deregisters from the IMS network element to disable VoLTE connections from being established with the mobile device by the 4G LTE/LTE-A network. In some embodiments, the mobile device deregisters from the IMS network element in response to a mobile-originated (MO) call, such as based on a user input to the mobile device to request a voice connection, when performance metrics indicate that a VoLTE connection may be unstable. The mobile device establishes the requested voice connection via a legacy 3G or 2G network instead, while established or new data connections for the mobile device continue to use the 4G LTE/LTE-A network. In some embodiments, the mobile device includes wireless circuitry that is tunable between the 4G LTE/LTE-A network and the legacy 3G or 2G network, the latter from which the mobile device can receive paging messages for establishing voice connections via the legacy 3G or 2G network using the tunable wireless circuitry. In some embodiments, the mobile device remains registered with the IMS network element in response to receiving an indication of an incoming mobile-terminated (MT) call from the 4G LTE/LTE-A network but ignores the indication and instead listens for a paging message from a legacy 3G or 2G network to which to respond to establish the MT call. In addition to received signal power, representative performance metrics include received signal quality, noise/interference levels, signal-to-noise-plus-interference ratio estimates, error rates, decoding failures, connection failure rates, and network cell loading. After deregistering from the IMS network element, the mobile device continues to monitor performance metrics for the one or more cells of the 4G LTE/LTE-A network and re-registers with the IMS network element when the performance metrics indicate improved radio frequency conditions.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
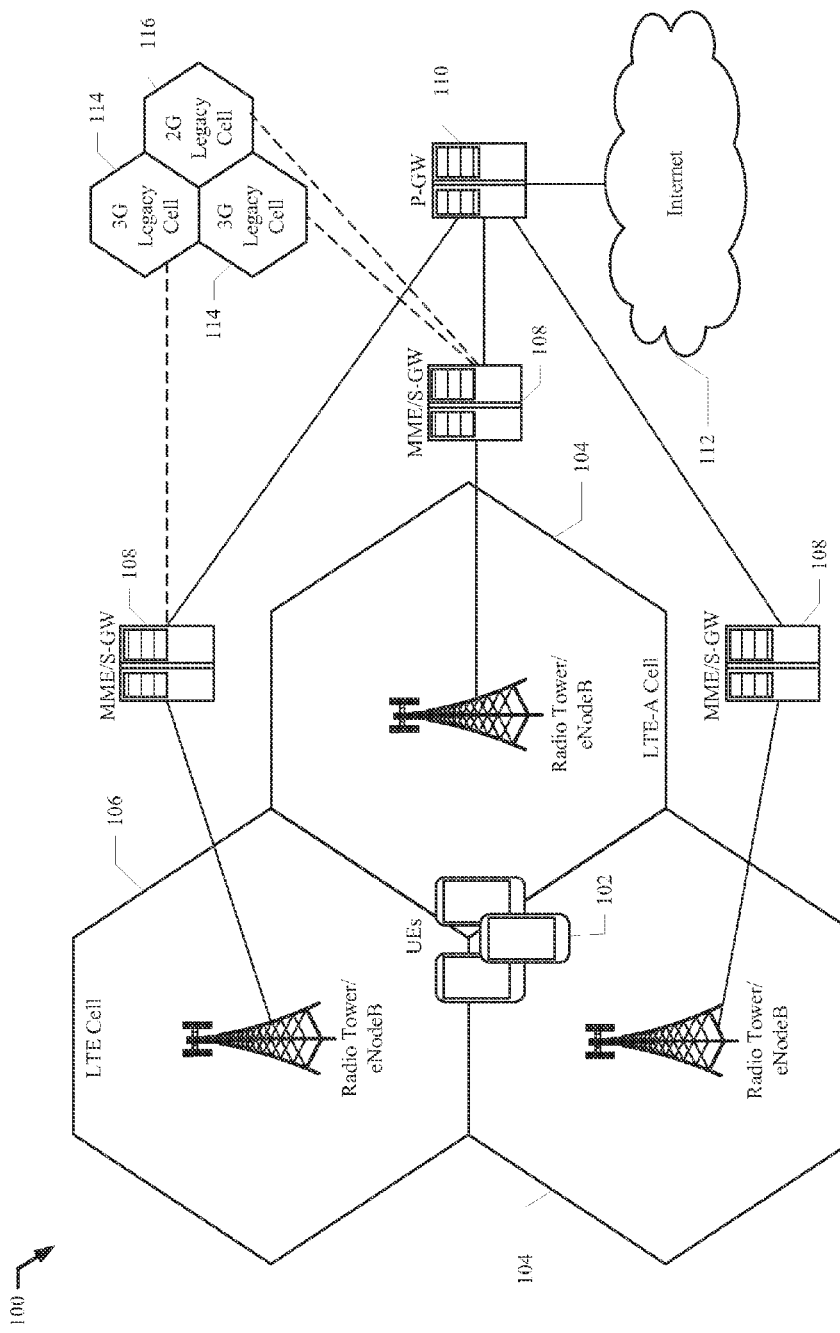
FIG. 1 illustrates a wireless communication system including a mixture of 4G Long Term Evolution (LTE), LTE-Advanced (LTE-A), 3G legacy, and 2G legacy network cells that support multiple user equipment (UE) devices that may be configured to perform various functions, in accordance with various embodiments of the disclosure.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE network, an LTE Advanced (LTE-A) wireless network, and/or a 5G or other present or future developed advanced cellular wireless network.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

In various implementations, a UE that complies with multiple, different communication protocols can operate as a multi-mode device by communicating within a 4G network cell employing a LTE or LTE-A radio access technology (RAT), as well as within a 3G or 2G network cell employing a legacy RAT. In some scenarios, a corresponding multi-mode communication device can be configured to prefer attachment to an LTE network offering faster data rate throughput, particularly for data connections, as compared to 3G or 2G legacy networks offering lower data rate throughput. In some implementations, when a 4G LTE network is unavailable at a UE's present location, or when connections via the 4G LTE network at the present location of the UE are weak, unstable, or difficult to establish, e.g., based on monitoring properties of channels, connections, and/or network cell loading for communication with the 4G LTE network, the UE may be configured to operate in a dual network mode in which data connections are established via the 4G LTE network while voice connections are established via a more reliable 3G or 2G legacy network. In some embodiments, the 3G or 2G legacy network is a CDMA 1× network interconnected with the 4G LTE network. In some embodiments, the UE, when establishing and/or accepting voice connections via the 4G LTE network operates in accordance with a VoLTE protocol, including registration of the UE with an Internet Protocol (IP) Multimedia Subsystem (IMS) network element. In some embodiments, when establishing and/or accepting voice connections via a 3G or 2G legacy network, e.g., the CDMA 1× network, the UE deregisters from the IMS network element and tunes wireless circuitry in the UE to communicate with the 3G or 2G legacy network, e.g., to receive paging messages from the 3G or 2G legacy network to establish a mobile-terminated voice connection and/or to request a mobile-originated voice connection via the 3G or 2G legacy network. In some implementations, the 4G LTE/LTE-A network supports VoLTE for voice connections but does not support an automatic circuit-switched fallback (CSFB) mechanism to a 3G or 2G legacy network for voice connections. In some embodiments, the 4G LTE/LTE-A network is interconnected with the 3G or 2G legacy network and based on whether the UE is registered with the IMS network element, establishes voice connections with the UE via the 4G LTE/LTE-A network, e.g., using VoLTE, when the UE is registered, and via the 3G or 2G legacy network, e.g., using legacy paging mechanisms, when the UE is not registered. In some embodiments, the UE deregisters from the IMS network element when performance metrics for the LTE network cell in which the UE operates indicates a voice connection may be unstable. In some embodiments, the UE deregisters from the IMS network element in response to a user input to establish a mobile-originated (MO) voice connection when performance metrics for the LTE network cell indicate low quality, e.g., based on one or more of: signal strength, signal quality, error rates, connection failures, or network loading. In some embodiments, the UE remains registered with the IMS network element when receiving a mobile-terminated (MT) voice connection request from the 4G LTE/LTE-A network to establish a VoLTE voice connection, including when the performance metrics indicate low quality, but ignores the VoLTE voice connection request and listens for paging messages from a parallel, overlapping 3G or 2G legacy network through which to receive the MT voice connection instead.

In some embodiments, the UE monitors channel conditions, network loading, and/or lower layer properties of a cell to determine whether the UE is operating in a region (and/or under signal/noise/interference conditions) in which voice connections may be unstable. The UE can monitor radio frequency conditions, such as reference signal received power (RSRP) levels, received signal strength indicator (RSSI) values, reference signal received quality (RSRQ) values, received signal code power (RSCP) values, signal-to-noise (SNR) values, signal-to-interference-plus-noise (SINR) values, bit error rate (BER) values, block error rate (BLER) values, decoding failures, or other similar metrics that can indicate poor communication channel conditions in which the UE operates. In some embodiments, the UE estimates a loading level for the cell and/or network, e.g., based on a comparison of downlink (DL) and/or uplink (UL) grants for resource blocks received from the cell and/or based on success rates for random access channel (RACH) access. When channel conditions, network loading conditions, interference/noise levels, signal strengths, signal quality, and/or other physical layer metrics indicate that a voice connection via a 4G LTE/LTE-A network may be unstable, the UE prioritizes voice connections via a legacy 3G or 2G network instead, e.g., by deregistering the UE from an IMS network element of the 4G LTE/LTE-A network, in order to disable receiving or establishing VoLTE connections via the 4G LTE/LTE-A network. In some embodiments, the UE periodically measures (at regular or irregularly spaced times) the 4G LTE/LTE-A network and re-registers with the IMS network element when radio frequency conditions and/or network loading indicate that voice connections via the 4G LTE/LTE-A network, e.g., using a VoLTE mechanism, are likely to be stable. In some embodiments, the UE assesses the state of the 4G LTE/LTE-A network upon receiving an indication of a mobile-originated (MO) voice connection, e.g., responsive to a user input to establish a voice connection, and when performance characteristics of the LTE/LTE-A network cell indicate poor quality, the UE switches to (if not already operating in) a dual network mode when a legacy 3G or 2G cell is available and performance characteristics of the legacy 3G or 2G cell indicate good quality. In the dual network mode, the UE communicates data packets via the LTE/LTE-A network cell and establishes and/or receives voice connections via the legacy 3G or 2G cell. In some embodiments, when no good quality legacy 3G or 2G cell is available, the UE continues to operate in a single network mode using the LTE/LTE-A network cell for both data communication and voice communication. In some embodiments, the UE deregisters from the IMS network element for establishing MO voice connections, when the LTE/LTE-A network cell quality is poor. In some embodiments, the UE maintains registration with the IMS network element but ignores IMS pages and instead listens for pages on a legacy 3G or 2G cell for mobile-terminated (MT) voice connections, when the LTE/LTE-A network cell quality is poor.

FIG. 1 depicts a heterogeneous wireless communication system 100 that is compliant with a 3GPP Evolved Universal Terrestrial Radio Access (E-UTRA) air interface, and includes, but is not limited to, LTE network cells 106 and LTE-A network cells 104, each having enhanced NodeB (eNodeB) base stations that can communicate between and amongst each other via an X2 interface. Further, the heterogeneous, E-UTRA-compliant wireless communication system 100 can include a number of mobility management entities (MMEs) 108, serving gateways (S-GWs) 108, PDN gateways (P-GWs) 110, etc., which, as part of the evolved packet core (EPC), can communicate with the eNodeBs of the LTE and LTE-A cells 104/106, via an S1 interface.

In various embodiments, the heterogeneous wireless communication system 100 may also be compliant with any number of 3G or 2G air interfaces, and as such, the heterogeneous wireless communication system 100 can include 3G legacy network cells 114 and/or 2G legacy network cells 116. Additionally, the heterogeneous wireless communication system 100 may include multiple UEs 102 that may be respectively provided wireless communications service by LTE network cells 106 and LTE-A network cells 104, as well as by 3G legacy network cells 114 and/or 2G legacy network cells 116, at any particular time based in part on a corresponding geographic location of a UE 102 operating within the heterogeneous wireless communication system 100.

By way of example, a UE 102 may be located within an LTE network cell 106 or an LTE-A network cell 106 when a user of the UE 102 initiates a VoLTE application to attempt to establish a VoLTE call (or more generally the user seeks to establish a voice connection irrespective of an underlying technology used by the UE 102 with which to establish the voice connection, which can include a packet-based VoLTE connection via an LTE network cell 106 or an LTE-A network cell 104, or a circuit-switched voice connection via a 3G legacy network cell 114 or a 2G legacy network cell 116, where the particular network used can depend on performance metrics measured and/or estimated by the UE 102 for one or more of the network cells. The UE 102 running the VoLTE application can establish a VoLTE call with an intended recipient by communicating voice call data to a serving eNodeB of the LTE network cell 106 or the LTE-A network cell 104. The corresponding eNodeB can forward VoLTE data through the EPC, via the MME/S-GW 108 and the P-GW 110, and thereby connect to the Internet 112 to transfer the VoLTE packet-based communications using an Internet Multimedia Subsystem (IMS) protocol, between the UE 102 and the device of the intended recipient, which may be a part of a remote network. The UE 102 can be configured to use a VoLTE connection when available via an LTE network cell 106 or LTE-A network cell 104 which has performance metrics that indicate the VoLTE connection may be stable.

Alternatively, the UE 102 may be registered with an IMS network element for VoLTE services and operating within an LTE network cell 106 or an LTE-A network cell 104 for which performance metrics indicate that a VoLTE connection may be unstable when a user of the UE 102 initiates an application to attempt to establish a voice connection. The UE 102 can determine based on the performance metrics to deregister from the IMS network element and instead tune wireless circuitry in the UE 102 to a 3G legacy network cell 114 or a 2G legacy network cell 116 through which to establish the user requested voice connection. In this manner, the UE 102 can ensure that the user receives a stable voice connection via the 3G or 2G legacy network cells 114/116 while also continuing to use the LTE/LTE-A network cells 104/106 for data communication.

It should be understood that the present disclosure describes various scenarios, where an LTE-compliant UE 102 can make proactive determinations of which of multiple overlapping wireless network to use at call initiation, e.g., in response to a call initiation event, such as when a user initiates a voice calling application at the UE 102 or a when an incoming call or a call request is detected by the UE 102. In various embodiments, the UE 102 can react to a detected call initiation event, by determining whether a voice call associated with the call initiation event should be established as a VoLTE call via a 4G LTE/LTE-A network or whether a voice call associated with the call initiation event should be established as a circuit-switched voice call via an available 3G or 2G legacy network. In some embodiments, the UE 102 registers with an IMS network element for VoLTE services when operating in LTE/LTE-A network cells 104/106 when performance metrics for the LTE/LTE-A network cell(s) 104/106 in which the UE 102 operates indicate that a VoLTE connection is likely to be stable and deregisters from the IMS network element to instead use a dual network mode (or more generally a multiple network mode) that communicates packet data via the LTE/LTE-A network cell(s) 104/106 and establishes/receives voice connections via 3G or 2G legacy network cell(s) 114/116. In some embodiments, the UE 102 normally remains registered with the IMS network element and deregisters in response to a mobile-originated voice call when performance metrics indicate that a voice connection is more likely to be stable via the 3G or 2G legacy network cell(s) 114/116 than via the 4G LTE/LTE-A network cell(s) 104/106.

Figure 2:
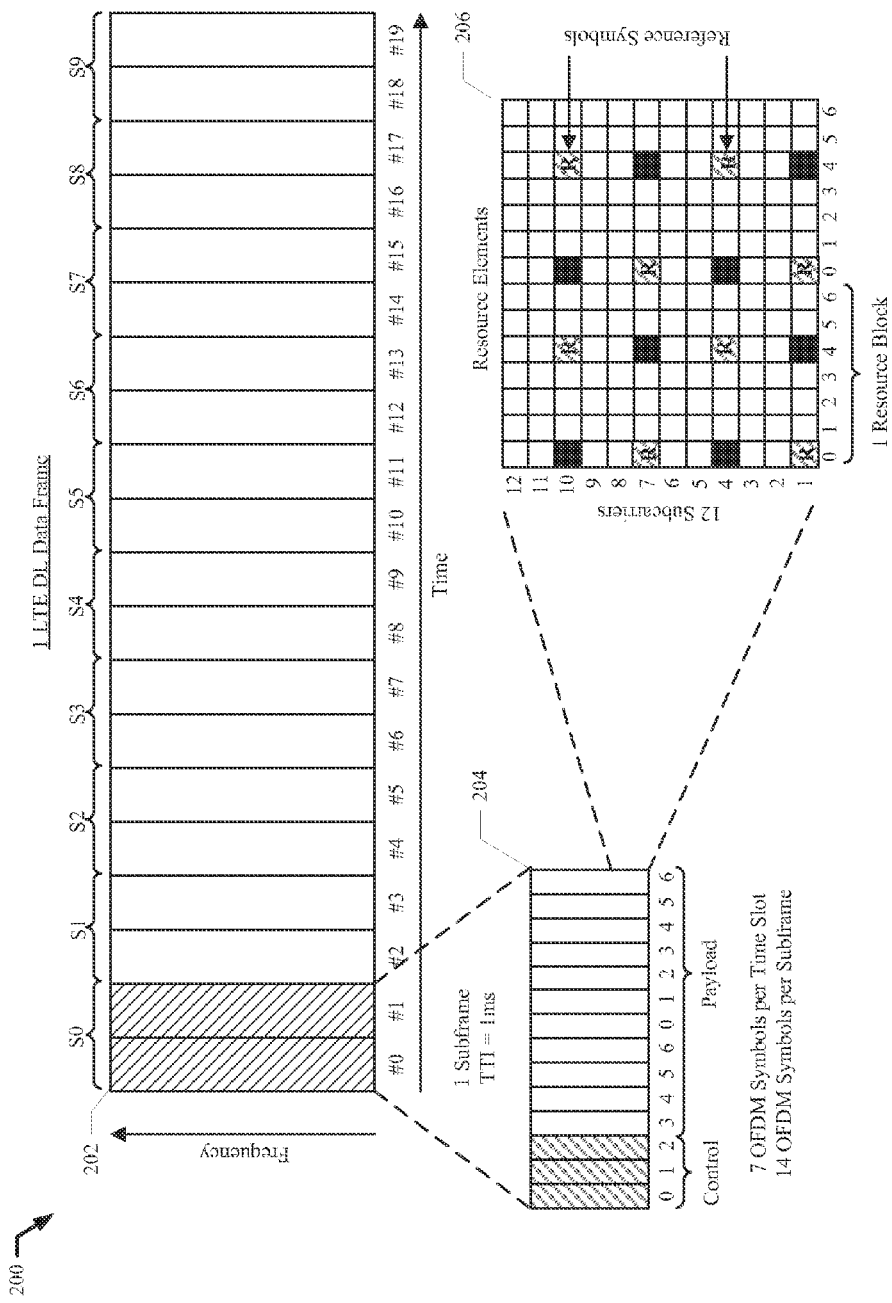
FIG. 2 illustrates a block diagram depicting a single LTE downlink (DL) data frame including a subframe-level resource block characterization having DL reference symbols that can be measured by a UE to determine a reference signal received power (RSRP) of a network base station, in accordance with various embodiments of the disclosure.

FIG. 2 illustrates a block diagram 200 depicting a single LTE data frame structure 202 in accordance with various implementations of the disclosure. As would be understood by those skilled in the art, one LTE data frame 202 includes ten subframes, labeled S0 through S9 in FIG. 2, each subframe spanning a transmission time interval (TTI) of one ms. An LTE subframe is further composed of two time slots, each time slot spanning a TTI of 0.5 ms. Accordingly, there are twenty time slots, labeled #0 through #19, within each LTE data frame 202. A first subframe 204, labeled S0, of the LTE data frame 202 may be composed of fourteen orthogonal frequency division multiplexing (OFDM) symbols, which equates to seven OFDM symbols per time slot, #0 and #1, of the first subframe 204 of the LTE data frame 202.

A first portion of the OFDM symbols (e.g., the first three OFDM symbols) of the first subframe 204 may be designated for control signaling information, and the remaining portion of the OFDM symbols of first subframe 204 may be designated for payload data. It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of five μs., or an extended CP having a duration of seventeen μs. Therefore, an LTE time slot employing a normal CP will have seven OFDM symbols; whereas, an LTE time slot employing an extended CP (e.g., intended for use in larger suburban cells in which longer ISI may occur) will have six OFDM symbols. An LTE resource block (RB) is associated with twelve OFDM subcarriers transmitting for the duration of one LTE time slot. Accordingly, a normal RB (associated with a normal CP) transmitting for 0.5 ms. will include a total of eighty-four OFDM symbols (twelve subcarriers×seven OFDM symbols) or resource elements (REs). Likewise, an extended RB (associated with an extended CP) transmitting for 0.5 ms. will include a total of seventy-two REs (twelve subcarriers×six OFDM symbols).

Further, a portion of each LTE subframe (e.g., S0) can be mapped to a time-frequency grid that consists of two RBs 206, which are respectively composed of twelve consecutive LTE subcarriers over the duration of seven OFDM symbols (symbols #0 to #6). An eNodeB can schedule a transmission for each RB during the duration of one time slot (lasting 0.5 ms). Each RB can consist of either eighty-four resources elements (REs) for normal CP or seventy-two REs for extended CP. An RE can be considered the smallest scheduled data unit in LTE and consists of one OFDM subcarrier during one OFDM symbol interval. Additionally, multiple reference symbols (RSs) are included within the subframe time-frequency grid 206 to facilitate physical layer measurements and channel estimation by the UE 102. The data communicated on the RSs can be known in advance to the UE 102 and used to determine one or more performance metrics, such as reference signal received power (RSRP) and/or received signal strength indicator (RSSI).

Figure 3:
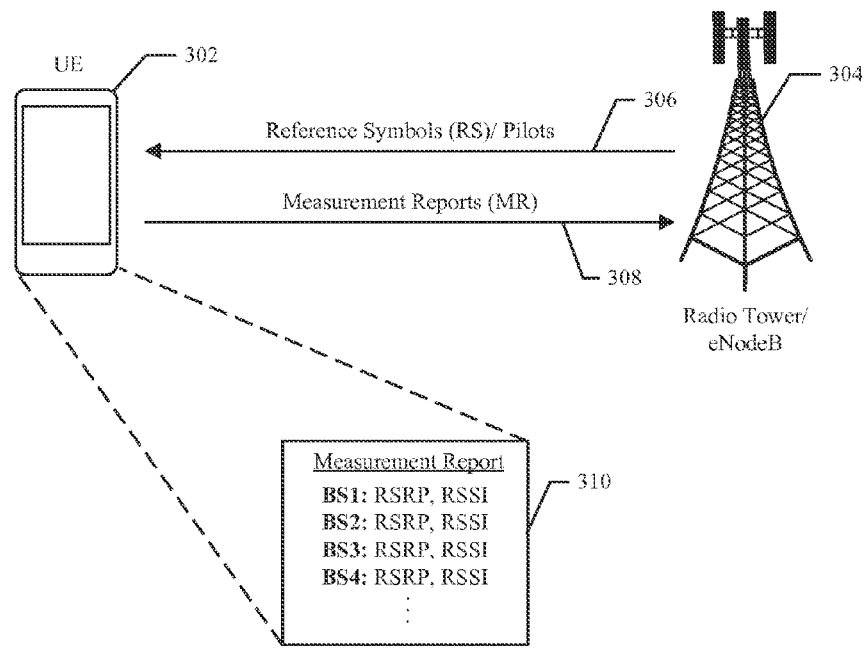
FIG. 3 illustrates a network diagram showing network measurement and reporting procedures between a UE and an eNodeB over the LTE-Uu air interface, in accordance with some embodiments of the disclosure.

FIG. 3 illustrates a network diagram 300 depicting various network device signaling, measurement, and reporting procedures between a UE 302 and an eNodeB 304 (e.g., via the LTE-Uu interface), in accordance with some embodiments of the disclosure. It should be understood that the eNodeB 304 and the UE 302 depicted in FIG. 3 may include the eNodeBs in the LTE/LTE-A network cells 104/106 and the UE 102 illustrated in FIG. 1. The eNodeB 504 can schedule various LTE DL data communications over any number subframe time slots, in accordance with the resource element time-frequency resource mapping 206 of FIG. 2.

The LTE DL communications can include various RSs, or pilot signals, 306 with which the UE 302 can measure using wireless circuitry signals and/or noise/interference and estimate various physical layer (or other "lower" layer) performance metrics for a communication channel between the UE 302 and the eNodeB 304. The UE 302 can provide information to the eNodeB 304, such as measurement reports 308, based on the measurements, and the eNodeB 304 can respond, under certain network conditions, to adjust communication with the UE 302. In some embodiments, when measurement reports 308 indicate that performance metrics fall below a threshold for reselection (when the UE 302 is in an idle state) and/or handover (when the UE 302 is in a connected state), the eNodeB 304 (in conjunction with additional network elements of an LTE/LTE-A network) can transfer the UE 302 from the current serving eNodeB 304 to another eNodeB of the LTE/LTEA network (or to a cell of another wireless network, such as to a 3G or 2G legacy network cell. The UE 302 can use a physical layer measurement and reporting component to determine a reference signal received power (RSRP) along with a received signal strength indicator (RSSI) for the serving eNodeB 304 and for other neighboring eNodeBs, e.g., neighboring network base stations that the UE 302 has detected as a result of a previous network search procedure and/or based on information provided by the serving eNodeB 304. As would be understood by those skilled in the art, an RSRP performance metric can be defined as an average received signal power of RSs received by the UE 302 from the serving eNodeB 304 during a particular time interval. The UE 302 can also measure other performance metrics, such as RRSI, RSRQ, RSCP, SNR, SINR, BER, BLER, and/or other physical layer (or "lower" layer) metrics that can characterize, at least in part, a radio frequency communication channel between the UE 302 and an eNodeB, such as eNodeB 304. When the UE 302 operates under marginal radio frequency performance metric conditions, e.g., at or near an edge of an LTE/LTE-A network cell 104/106, the UE 302 can experience unstable voice connections through the LTE/LTE-A network cell 104/106. In some circumstances, the performance metrics can have higher values than those required by the LTE/LTE-A network to switch to a different cell, e.g., by reselection or handover, yet may have lower values than those needed to maintain a consistent voice connection. As network operators typically provide for communication through various earlier generation wireless networks in parallel with newer generation wireless networks, such as via 3G or 2G legacy networks in parallel with the deployment of 4G LTE/LTE-A networks, the LTE/LTE-A network can be interconnected with one or more 3G or 2G legacy networks and allow the UE 302 to operate in a dual network mode, where data connections are provided by the LTE/LTE-A network and voice connections are provided by either the LTE/LTE-A network (such as using VoLTE) or a 3G or 2G legacy network, e.g., using paging messages in accordance with a 3G or 2G legacy wireless communication protocol. Based on an assessment by the UE 302 that the LTE/LTE-A network cell may not provide stable voice connections using VoLTE, the UE 302 deregisters (either proactively before a voice connection is attempted) or in response to voice connection establishment request, e.g., a mobile-originated voice connection request form a user of the UE 302. The UE 302 can establish the voice connection through the 3G or 2G legacy wireless network instead.

Figure 4:
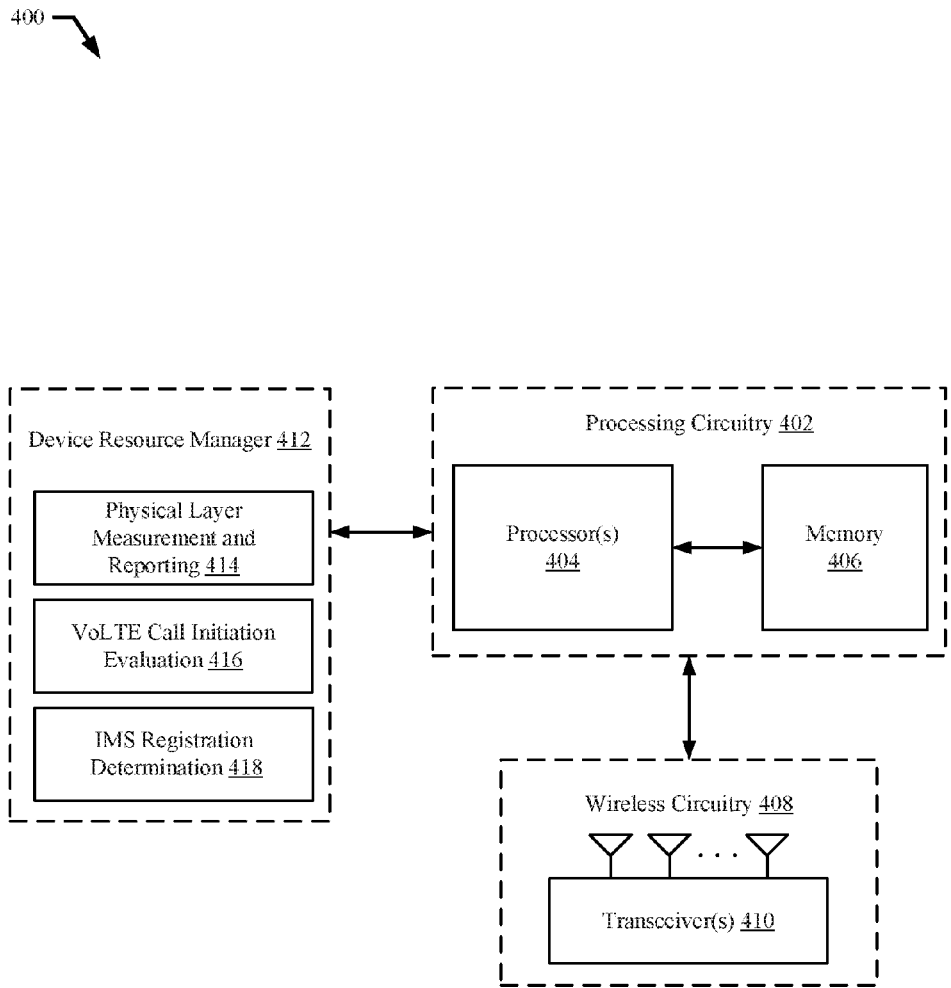
FIG. 4 illustrates a block diagram of a wireless communication device including a device resource manager having a physical layer measurement and reporting component, a voice over LTE (VoLTE) call initiation determination component, and an IMS registration determination component, in accordance with some implementations of the disclosure.

FIG. 4 illustrates a block diagram 400 of a set of components of a communication device (e.g., an LTE or LTE-A compliant UE 102) including wireless circuitry 408 including one or more transceiver(s) 410, as well as, a device resource manager 412 including a physical layer measurement and reporting component 414, a VoLTE call initiation evaluation component 416, and an IMS registration determination component 418 in accordance with some embodiments of the disclosure. In various configurations, the communication device illustrated by the block diagram 400 of FIG. 4 can include processing circuitry 402 that can perform various network mode determination procedures, e.g., whether to operate in a "dual network" mode using data via a first network, e.g., an LTE/LTE-A network, and voice via a second network, e.g., a 3G or 2G legacy network. The processing circuitry 402 can function in conjunction with elements of the device resource manager 412 to measure/estimate performance metrics for communication channel(s) between the communication device and one or more cells of one or more networks in which the communication device operates. The processing circuitry 402 can cause the communication device to be configured to operate in a dual network mode or a single network mode based on measurements and an evaluation performed by the device resource manager 412 for signals received through the wireless circuitry 408. The processing circuitry can be configured to configure the wireless circuitry 408 in order to support data and voice connections through an LTE/LTE-A network in a "single network" mode or to support data connections through the LTE/LTE-A network and voice connections through the 3G or 2G legacy network in a "dual network" mode.

The processing circuitry 402 of the communication device can use the physical layer measurement and reporting component 414 to perform various wireless signal received power and received quality measurements (e.g., of various RSs to determine RSRP and/or RSSI/RSRQ metrics) of one or more eNodeBs 304. The processing circuitry 402 of the communication device can also use the physical layer measurement and reporting component 414 to report various radio signal measurements to the UE's serving eNodeB 304. The processing circuitry 402 of the communication device may use the physical layer measurement and reporting component 414 to perform physical layer measurements when a VoLTE call initiation evaluation component 416 of the device resource manager 412 detects a voice call initiation event, e.g., in response to a user requesting to establish a voice connection. In some embodiments, based on performance metrics determined by the physical layer measurement and reporting component 414, the IMS registration determination component 418 of the device resource manager 412 in the communication device can deregister from an IMS network element before initiating the voice connection, thereby forcing the communication device to instead establish the voice connection through a legacy 3G or 2G network cell rather than through an LTE/LTE-A network cell.

The processing circuitry 402 of the communication device 400 can use the IMS registration determination component 418 of the device resource manager 412 to carry out various network mode selection procedures in response to determining a trigger event has occurred, when a voice connection establishment is initiated. In this regard, the processing circuitry 402 can be configured to perform and/or control performance of one or more functionalities of the communication device 400 in accordance with various implementations, and thus, the processing circuitry 402 can provide functionality for performing different proactive network mode selection procedures, in accordance with various scenarios that are described further herein. The processing circuitry 402 may further be configured to perform data processing, application execution and/or other control and management functions according to one or more embodiments of the disclosure.

A communication device, or portions or components thereof, such as the processing circuitry 402, can include one or more chipsets, which can respectively include any number of coupled microchips thereon. The processing circuitry 402 and/or one or more other components of the communication device may also be configured to implement functions associated with various enhanced device mobility functions using multiple chipsets. In some scenarios, the communication device may be associated with or employed as a UE 102 that can operate in an LTE network cell 106 or an LTE-A network cell 104, in accordance with an LTE/LTE-A wireless communication protocol, or in a legacy 3G or 2G network cell 114/116 in accordance with a legacy wireless communication protocol. The communication device may include one or more chipsets configured to enable the communication device to communicate via the LTE/LTE-A network 104/106 of the wireless communication system 100.

In various scenarios, the processing circuitry 402 of the communication device may include one or more processor (s) 404 and a memory component 406. The processing circuitry 402 may be in data communication with, or otherwise coupled to, wireless circuitry 408 having one or more transceivers 408 for wireless communication. In some implementations, the wireless circuitry 408 including the one or more transceivers 410 may be configured to communicate using different RAT types. For instance, in some embodiments the wireless circuitry 408 may be configured to communicate using an LTE RAT, and in other embodiments, the wireless circuitry 408 may be configured to communicate using an LTE-A RAT. Further, the wireless circuitry 408 may also be configured to communicate using any number of different 3G legacy RAT types, as well as any number of 2G legacy RAT types. In some embodiments, the wireless circuitry 408 may be configured to communicate data packets via an LTE/LTE-A RAT and to voice using circuit-switched connections via a legacy 3G or 3G RAT, under certain circumstances as described herein.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device can be coupled to and/or configured in operative communication with each other, and these components may be collectively configured to perform one or more procedures of the communication device as described herein in the form of an LTE-compliant UE 102.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device.

It should be appreciated that not all of the components, device elements, and hardware illustrated in and described with respect to the communication device of FIG. 4 may be essential to this disclosure, and thus, some of these items may be omitted, consolidated, or otherwise modified within reason. Additionally, in some implementations, the subject matter associated with the communication device can be configured to include additional or substitute components, device elements, or hardware, beyond those depicted within FIG. 4.

Figure 5:
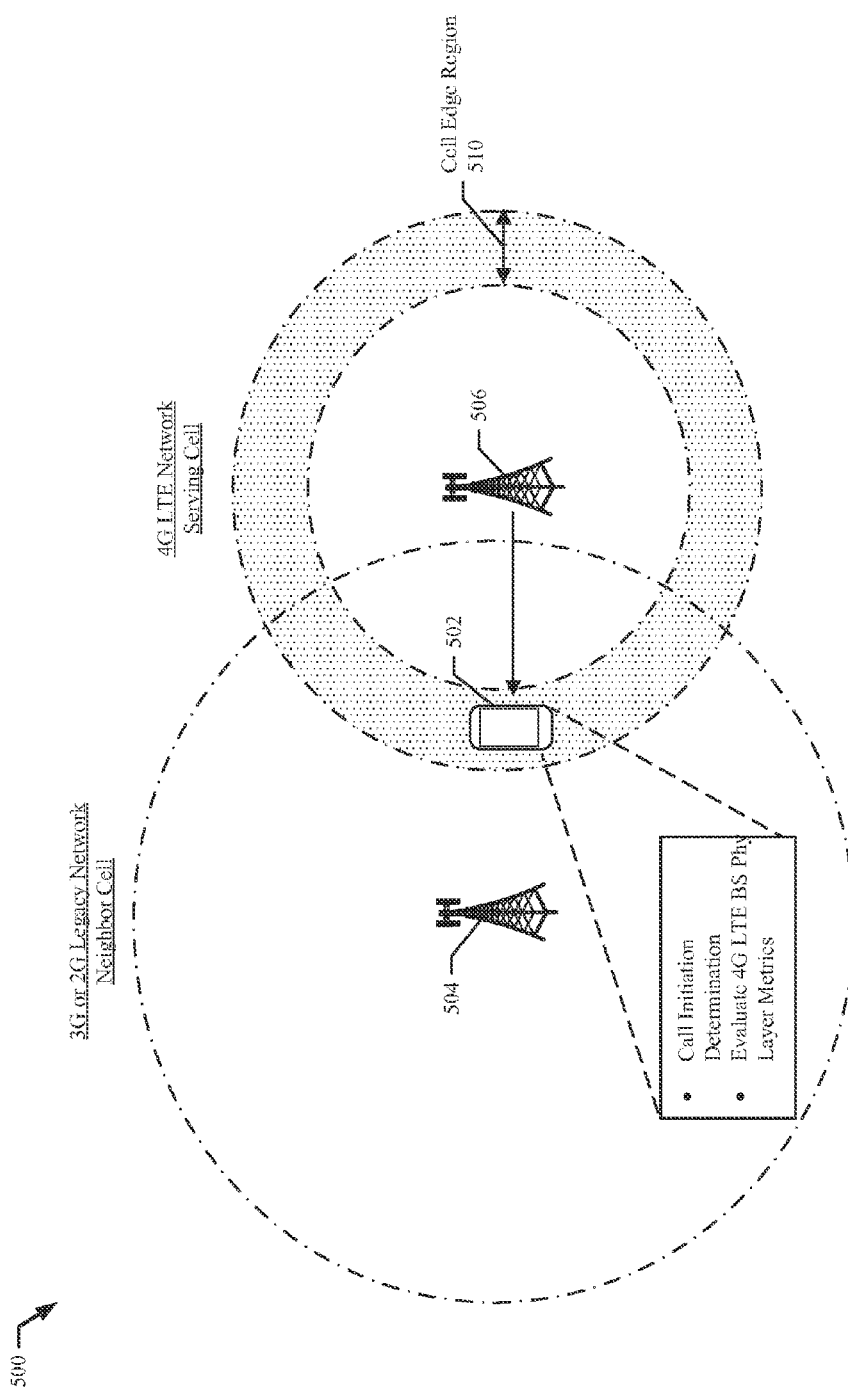
FIG. 5 illustrates a network diagram depicting a UE mobility scenario where a UE operates in an overlapping region covered by both a serving 4G LTE network cell and a 3G or 2G legacy neighbor network cell, in accordance with various implementations of the disclosure.

FIG. 5 illustrates a network diagram 500 depicting a UE mobility scenario where a UE 502 moves into (and/or operates within) a cell edge region 510 of a serving 4G LTE network cell associated with a serving eNodeB 506, where the cell edge region 510 overlaps with a 3G or 2G neighbor legacy network cell associated with a legacy network base station 504. The UE 502, upon determination that a voice connection is requested (e.g., based on a user input to establish a voice call) and/or initiated (e.g., based on an incoming message from the 4G LTE network serving cell), can evaluate performance metrics for the 4G LTE network serving cell to determine whether to establish the voice connection via the 4G LTE network serving cell (e.g., using a VoLTE application) or via an available 3G or 2G legacy network neighbor cell that provides suitable performance metrics for the voice connection. In some embodiments, when the performance metrics measured for the 4G LTE network serving cell indicate that the voice connection may be unstable when established through the 4G LTE network serving cell, the UE 502 can deregister from an IMS network element of the 4G LTE network before establishing a voice connection via an available and suitable 3G or 2G legacy network neighbor cell. In some embodiments, the performance metrics include a measure of signal power from the 4G LTE network serving cell, and the UE 502 can determine that the RSRP of its serving eNodeB 506 falls below a RAT-specific threshold (e.g., a RSRP threshold associated with an LTE or LTE-A RAT). The UE 502 can also determine whether performance metrics for an available 3G or 2G legacy network neighbor cell are sufficient (e.g., satisfy a 3G or 2G RAT-specific threshold) for establishing and maintaining a voice connection via the 3G or 2G legacy network neighbor cell. The UE 502 can deregister from the IMS network element of the 4G LTE network serving cell, in some embodiments, when detecting initiation of a mobile-originated voice connection and the 4G LTE network serving cell does not satisfy the performance metrics and a suitable (satisfactory performance) 3G or 2G legacy network cell is available. In some embodiments, the UE 502 can remain registered with the IMS network element of the 4G LTE network serving cell, when detecting a request for a mobile-terminated voice connection, such as a message from the 4G LTE network serving cell, but ignore the message from the 4G LTE network serving cell and instead listen for a paging message from the 3G or 3G legacy network neighbor cell, when performance metrics for the 4G LTE network serving cell indicate unsatisfactory performance and performance metrics for the 3G or 2G legacy network neighbor cell indicate satisfactory performance, and upon receiving the paging message establish the voice connection via the 3G or 2G legacy network cell.

By way of example, the UE 502 may be initially positioned near its serving eNodeB 506 within a first coverage area, where the UE 502 would likely experience good received signal strength, good received signal quality, and minimal network interference from neighboring cells, while communicating with its serving eNodeB 506. However, in a scenario where the UE 502 moves into the cell edge region 610 associated with its LTE serving network cell, the UE 502 could experience a significant amount of Transmit (TX) radio signal path loss (e.g., for TX communications from its serving eNodeB 506), as well as a substantial amount of interference from a neighbor network base station 504.

As would be understood by those skilled in the art, path loss (a.k.a., path attenuation) is associated with a reduction in power density of a radio signal as it propagates through space. Path loss is influenced by geographic terrain, environment, and a distance between a transmitter (e.g., eNodeB 506) and a receiver of a wireless communication device (e.g., the UE 502), and the height and location of or one or more transmitting radio antennas (e.g., antennas associated with the wireless circuitry of the 4G LTE network serving cell's eNodeB 506).

In some embodiments, the UE 502 may be configured to periodically measure/monitor performance metrics, such as RSRP, of its serving eNodeB 506, as well as performance metrics, such as RSRP(s), of one or more neighbor base stations 504, using its physical layer measurement and reporting component 414. At a certain instance, while the UE 502 is moving away from the serving eNodeB 506, the UE 502 may identify the occurrence of a network measurement reporting event that could be associated with a breach of a RAT-generic threshold (e.g., any of the handover/reselection thresholds depicted in Table 1, below) or a RAT-specific threshold (e.g., a threshold that differs from the handover/reselection thresholds depicted in Table 1).

By way of example, Table 1 lists various measurement reporting events associated with 3GPP LTE Release 8 and 3GPP LTE-A Release 10 wireless communication protocol specifications.

TABLE 1

LTE and LTE-A Measurement Reporting (MR) Events

Intra-system MR events:

A1 Serving cell > Threshold
A2 Serving cell < Threshold
A3 Neighbor cell > Serving cell by an offset
A4 Neighbor cell > Threshold
A5 Serving cell < Threshold 1; Neighbor cell > Threshold 2
A6 Neighbor cell > Secondary cell by an offset Inter-system MR events:

B1 Inter-system Neighbor cell > Threshold
B2 Serving cell < Threshold 1; Inter-system Neighbor cell > Threshold 2

In various implementations, when the UE 502 measures the serving eNodeB 506 having an RSRP value ($RSRP_{SC}$) less than a RAT-specific threshold $TH_{LTE}$ (e.g., an LTE-specific threshold below which the UE 502 may elect to establish and/or terminate voice connections via a different network cell that the current 4G LTE network serving cell) and greater than a RAT-generic network threshold $TH_{NW}$ (e.g., any of the handover/reselection thresholds depicted in Table 1 for which the UE 502 may elect to handover/reselect to another network cell), at call initiation, the UE 502 can make a call initiation determination, e.g., using the VoLTE call initiation evaluation component 416 in conjunction with the IMS registration determination component 418. When the UE 502 detects a call initiation event (e.g., when a user of the UE 502 attempts to make a voice call), the UE's 502 IMS registration determination component 418 may use measurements and/or decisions from the physical layer measurement and reporting component 414 to determine based on the measurements, such as by comparing the current RSRP value ($RSRP_{SC}$) of the serving eNodeB 506 to the LTE RAT-specific threshold $TH_{LTE}$, whether to maintain registration with the IMS network element or to deregister from the IMS network element to prevent establishing a VoLTE call, and instead establish a voice connection via an available and suitable (e.g., satisfies at least one or more performance metric thresholds) 3G or 2G legacy network neighbor cell. When the UE 502 detects a voice connection request initiated by the LTE network, e.g., based on a message to establish a VoLTE call, the UE 502 can ignore the message and instead listen for paging messages from the 3G or 2G legacy network cell. Data connections that exist at the time of the voice connection establishment (or that are setup after the voice connection is active) can remain or be established via the 4G LTE network, while voice connections can be established via the 3G or 2G legacy network. In some embodiments, the UE 502 can support parallel data and voice connections through two different wireless networks that support two different RATs. While the discussion above uses RSRP as a representative performance metric by which the UE 502 makes a determination whether to deregister from the IMS network element (or to ignore VoLTE establishment messages from the 4G LTE network), other performance metrics based on signal quality, signal strength, error rates, or packet retransmissions, alone or in combination can be used to assess the physical layer properties of a communication channel between the UE 502 and the 4G LTE network serving cell. When performance metrics for the 4G LTE network serving cell indicate voice connections via the 4G LTE network may be problematic, e.g., unstable connection and/or call setup failures, the UE 502 can "back down" to use of a 3G or 2G legacy neighbor cell for voice connections.

Figure 6:
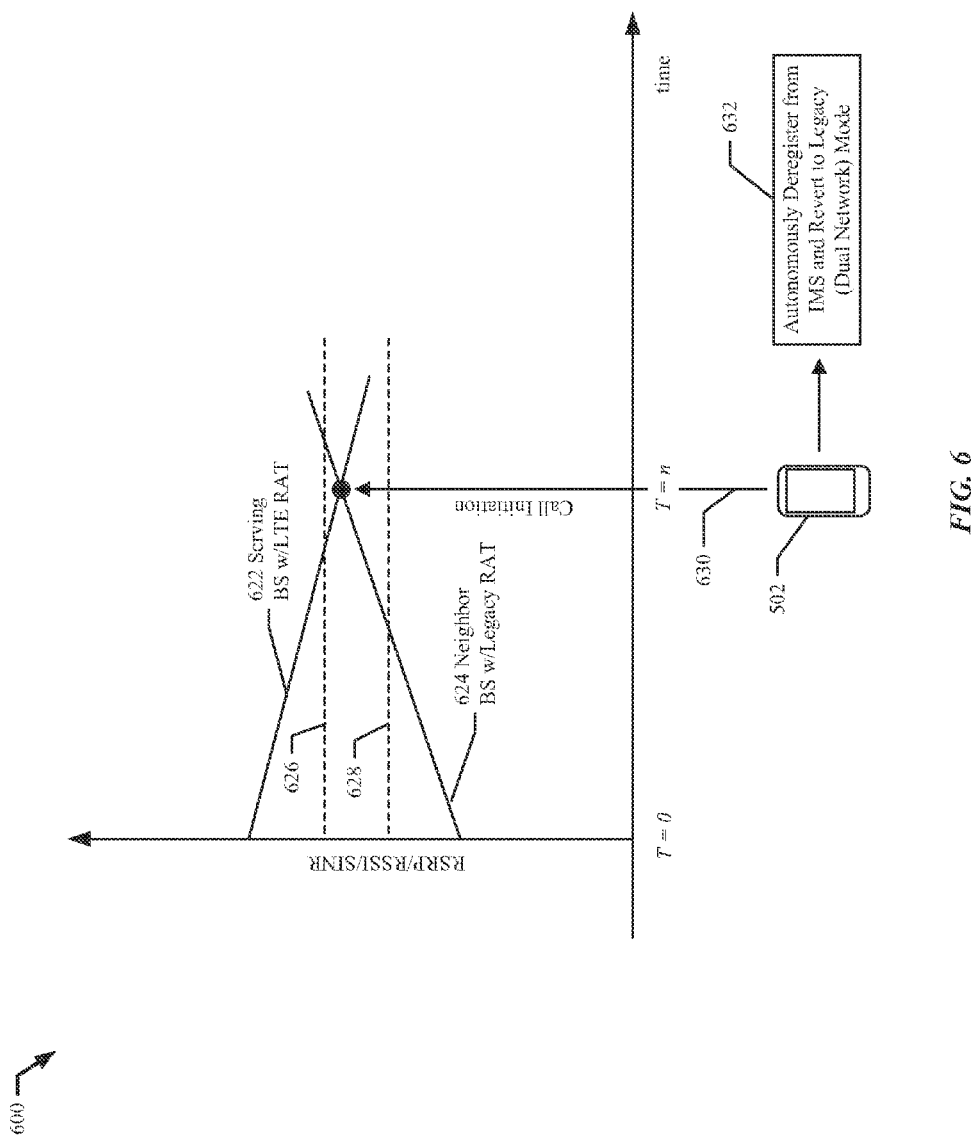
FIG. 6 illustrates a graph depicting a device mobility scenario for a UE operating in an RRC Idle Mode, when at call initiation an RSRP of a serving LTE cell is below a RAT-specific threshold and above a RAT-generic threshold, triggering deregistration from an IMS network element, in accordance with various embodiments.

FIG. 6 illustrates a diagram 600 including a device mobility scenario for a UE 502 that, at call initiation 630 (at time T=n), a performance metric for the LTE network serving cell 622, e.g., an RSRP or SINR value, falls below a RAT-specific threshold 626 and remains above a RAT-generic threshold 628. (Additionally and/or alternatively, the UE 502 can account for performance metrics in a recent past time period.) At time T=0, the LTE network serving cell performance metric 622 associated with an eNodeB of the 4G LTE network serving cell can exceed the RAT-specific threshold 626, while at the same time, a legacy network neighbor cell performance metric 624 for a base station of a 3G or 2G legacy network cell may fall below both the RAT-specific threshold 626 and the RAT-generic threshold 628. The legacy network performance metric 624 can be a metric appropriate for the type of wireless communication protocol used by the 3G or 2G legacy network, e.g., an RSSI or SINR value. The performance metric values for each network cell can change as the UE 502 changes location.

In accordance with some embodiments, at a particular time, T=n, a call initiation event 630 may be detected by the UE 502, e.g., using the VoLTE call initiation evaluation component 416. The UE 502 can use the IMS registration determination component 418 in conjunction with the physical layer measurement and reporting component 414 to determine whether the 4G LTE network serving cell performance metric 622 associated with the serving eNodeB falls below the RAT-specific threshold 626, for the purpose of determining how best to establish an ensuing voice call associated with the call initiation event 630. In a scenario where the IMS registration component 418 determines that the 4G LTE network serving cell performance metric 622 associated with the serving eNodeB is below the RAT-specific threshold 626 (e.g., at a time when no other suitable neighbor LTE eNodeBs are available to provide VoLTE communication service to the UE 502 at its present network location) the UE 502 can deregister from the IMS network element, to disable VoLTE communication by the UE 502. The UE 502 can revert to a legacy "dual network" mode in which the UE 502 communicates data via the 4G LTE network and communicates voice via the 2G or 3G legacy network. The UE 502 can continue to monitor performance metrics (and remain associated with the LTE eNodeB of the 4G LTE network serving cell, unless conditions deteriorate to the point that a cell reselection/handover procedure occurs). The UE 502 can re-register with the IMS network element when performance metrics for the LTE eNodeB of the 4G LTE network serving cell improve and indicate that reliable voice communication using VoLTE can be sustained. While the discussion above uses a signal strength or signal power metric as an example, other metrics such as signal quality and/or signal-to-noise-plus-interference ratios can also be used.

Figure 7:
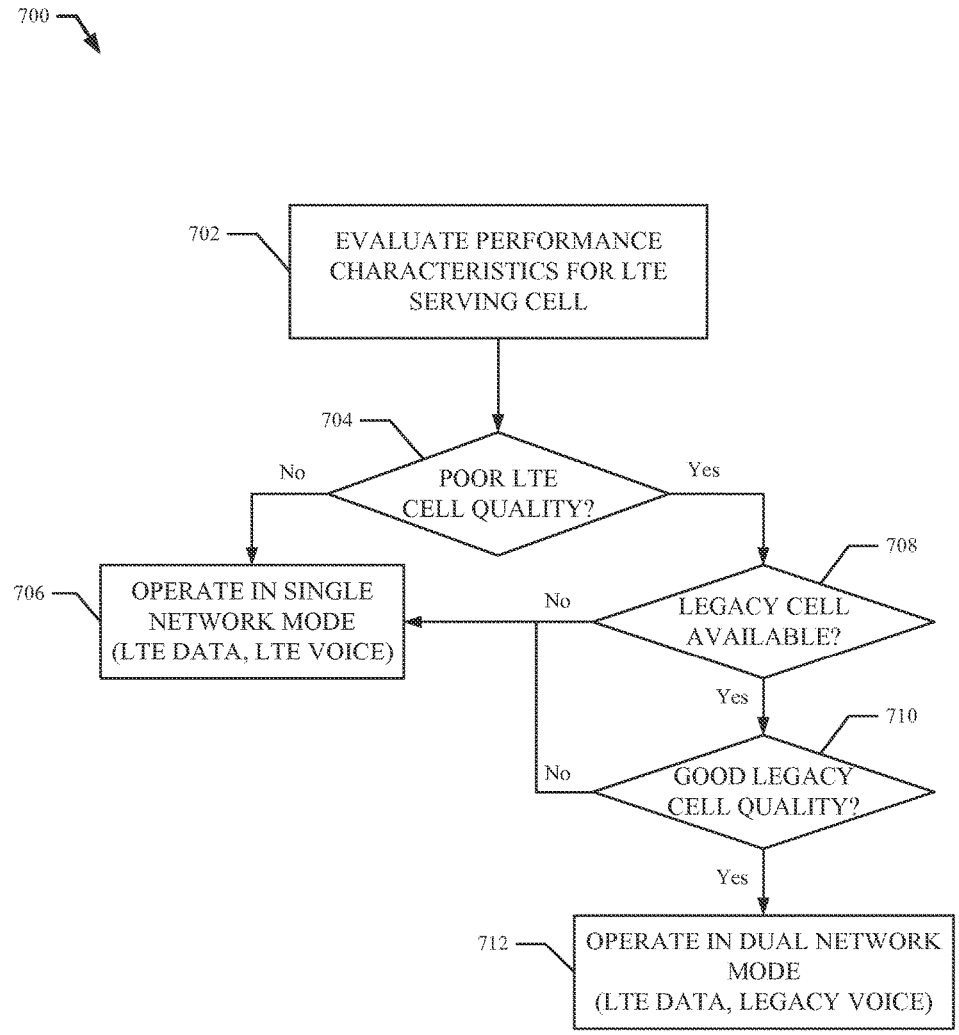
FIG. 7 illustrates a flowchart depicting an example method for selecting between a single network mode and a dual network mode for a UE, in accordance with some implementations of the disclosure.

FIG. 7 illustrates a flowchart depicting an example method for selecting between a single network mode and a dual network mode for a UE 102, in accordance with some implementations of the disclosure. During "normal" operation, a UE 102 can measure performance characteristics of a serving cell, such as a 4G LTE serving cell, with which the UE 102 can be associated, in an E-UTRA radio resource control (RRC) idle mode or in an E-UTRA RRC connected mode, and also measure performance characteristics of neighbor cells, such as other 4G LTE cells as well as 3G or 2G legacy network cells. In step 702, the UE 102 evaluates performance characteristics for the 4G LTE serving cell. Representative performance characteristics can include measures of signal strength, such as RSRP and RSSI, measures of signal quality, such as SNR and SINR, measures of communication errors, such as BER, BLER, packet error rates, decoding failures, etc., and/or measures of cell loading, such as based on channel access failures and/or insufficient grants in response to scheduling requests. In step 704, the UE 102 determines, based at least in part on the evaluated performance characteristics of the 4G LTE serving cell, whether the 4G LTE serving cell's quality does not satisfy a threshold to establish and/or maintain a VoLTE connection. When the 4G LTE serving cell's quality does satisfy the threshold, in step 706, the UE 102 can operate in a "single network mode" in which both data and voice can be communicated via the 4G LTE serving cell. Thus, the UE 102 can initiate and/or receive VoLTE connections for voice communication via the 4G LTE serving cell. When the 4G LTE serving cell's quality does not satisfy the threshold, in step 708, the UE 102 can determine whether a legacy 3G or 2G neighbor cell is available as an alternative means of communication. When no legacy 3G or 2G neighbor cell is available, the UE 102 can continue to operate in a single network mode using the 4G LTE serving cell for communication of both data and voice. When at least one legacy 3G or 2G neighbor cell is available, the UE 102 can evaluate the performance characteristics of the legacy 3G or 2G neighbor cell to determine whether the legacy 3G or 2G neighbor cell can provide an acceptable voice connection, e.g., based on whether the legacy 3G or 2G neighbor cell satisfies a threshold (which can be a different threshold than used for the 4G LTE serving cell). As discussed above, the UE 102 can evaluate neighbor cells as part of normal operation, and the UE 102 can have access to the performance characteristics of the neighbor cells, e.g., as part of providing measurement reports to the 4G LTE serving cell to use in cell reselection and/or handover decisions. When the UE 102 determines that no available legacy 3G or 2G neighbor cell satisfies the threshold, the UE 102 can continue to operate in a single network mode using the 4G LTE serving cell for communication of both data and voice. When at least one legacy 3G or 2G neighbor cell does satisfy the threshold, as determined in step 710, the UE 102, in step 712, can operate in a dual network mode in which the UE 102 can use the 4G LTE serving cell for data communication and the legacy 3G or 2G neighbor cell for voice communication.

In some embodiments, the threshold for the 4G LTE serving cell includes an LTE-specific threshold that differs from a RAT-generic threshold used by the 4G LTE serving cell to determine whether to perform a cell reselection or handover procedure for the UE 102 from the 4G LTE serving cell a neighbor cell. In some embodiments, the threshold for the 4G LTE serving cell below which the UE 102 determines whether to operate in a dual network mode includes a value for signal strength or signal quality that exceeds a value used for reselection or handover by the 4G LTE serving cell. In some embodiments, the threshold includes a value for RSRP or RSSI. In some embodiments, the UE 102 evaluates multiple performance characteristics each of which can have its own threshold for determining whether to operate in a single network mode or in a dual network mode. The UE 102 can use a combination of one or more performance characteristics compared against a corresponding set of one or more thresholds to determine whether to operate in the single network mode or the dual network mode, e.g., based on two or more performance characteristics not satisfying respective thresholds. In some embodiments, when at least one performance characteristic threshold of a plurality of performance characteristic thresholds is not satisfied, the UE 102 determines whether to use an available and suitable 3G or 2G legacy cell for voice communication rather than the 4G LTE serving cell. In some embodiments, the UE 102 evaluates the performance characteristics based on detecting a request to establish a voice connection, e.g., a user input to set up a voice call or an incoming message from the 4G LTE serving cell indicating an incoming voice connection. In some embodiments, the UE 102 deregisters from an IMS network element in (and/or associated with) the 4G LTE network in order to disable VoLTE communication based on evaluation of performance characteristics of the 4G LTE serving cell. In some embodiments, the UE 102 operates instead in a dual network mode in which the UE 102 communicates data via the 4G LTE serving cell and voice via a 3G or 2G legacy neighbor cell. In some embodiments, the 4G LTE network and the 3G or 2G legacy network are interconnected such that an incoming voice call can be established with the UE 102 via the 4G LTE network as a VoLTE call, when the UE 102 is registered with an IMS network element, and can be established with the UE 102 via the 3G or 2G legacy network, when the UE 102 is not registered with the IMS network element. In some embodiments, the 4G LTE network can also establish a voice connection with the UE 102 via the 3G or 2G legacy network irrespective of whether the UE 102 is registered with the IMS network element, such as when the UE 102 does not respond to a request to establish a VoLTE connection, the 4G LTE network can signal to the 3G or 2G legacy network to send a paging message to the UE 102 via one or more 3G or 2G legacy cells in order to establish the voice connection with the UE 102 via a 3G or 2G legacy neighbor cell rather than using a VoLTE connection via the 4G LTE serving cell.

Figure 8:
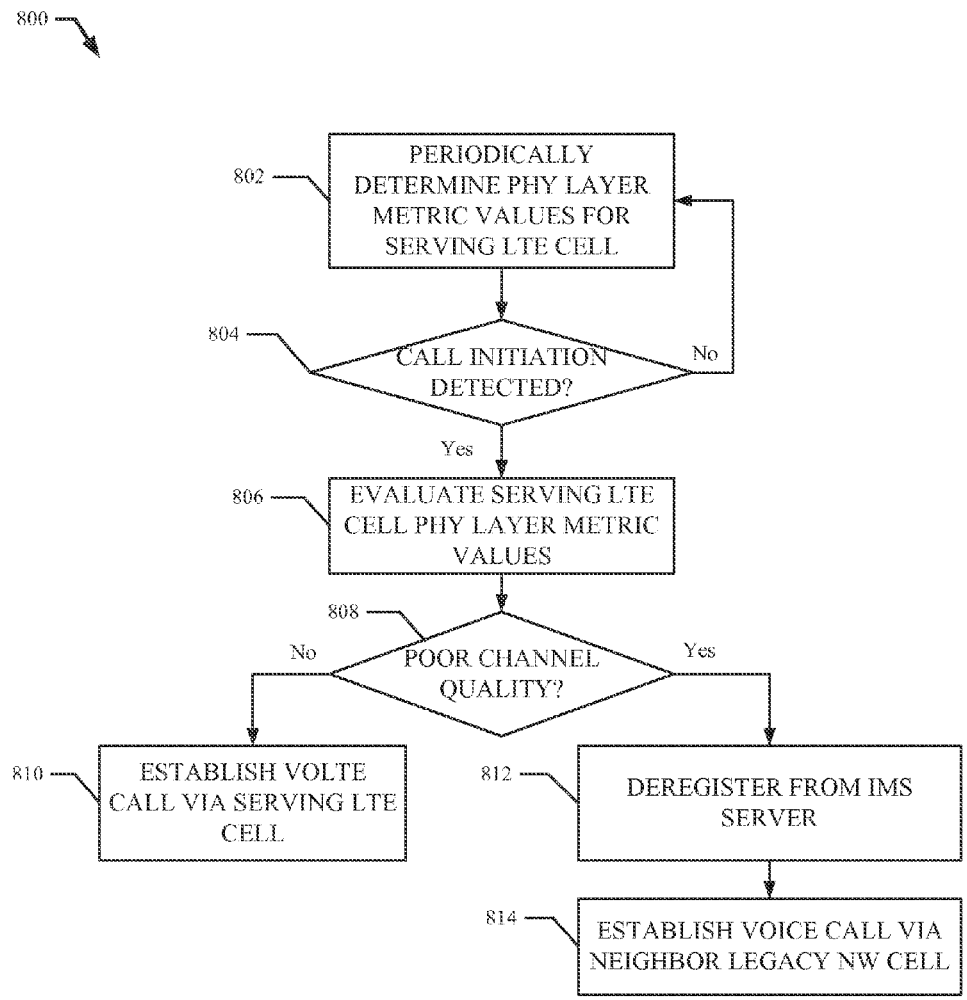
FIG. 8 illustrates a flowchart depicting an example method for establishing a voice connection through a network based on performance metrics determined by a UE, in accordance with some embodiments of the disclosure.

FIG. 8 illustrates a flow chart 800 of an example method for establishing a voice connection through a network based on performance metrics determined by a UE 102, in accordance with some embodiments of the disclosure. In step 802, the UE 102 can determine one or more physical layer metric values for a 4G LTE serving cell. The UE 102 can measure the 4G LTE serving cell and in some embodiments one or more neighbor cells as part of a measurement and reporting procedure, e.g., on a regular periodic basis and/or in response to information requests from the 4G LTE serving cell. The UE 102 can maintain recent values for physical layer metrics, such as RSRP, RSSI, SNR, SINR, BER, BLER, PER, or other metrics as discussed herein. In response to detection of call initiation at step 804, the UE 102 can subsequently in step 806 evaluate one or more of the physical layer metric values to ascertain whether the 4G LTE serving cell provides sufficient quality to establish and/or maintain a VoLTE connection via the 4G LTE serving cell. In step 808, in response to detecting that the 4G LTE serving cell does not satisfy one or more performance metrics, e.g., may likely not provide sufficient channel quality for the UE 102 to establish and/or maintain a VoLTE connection, the UE 102 can deregister from the IMS network element (which can be a server in some embodiments), in step 812, and establish a voice connection via a neighbor legacy network cell, e.g., a 3G or 2G legacy neighbor cell. Alternatively, when the UE 102 determines, based at least in part on the physical layer metric values, that the 4G LTE serving cell provides sufficient channel quality to establish and/or maintain a VoLTE connection, the UE 102, in step 810, establishes a voice connection via the 4G LTE serving cell. In some embodiments, upon completion of the voice connection via the neighbor legacy network well, the UE 102 re-registers with the IMS network element, and the process illustrated in FIG. 8 can repeat. In some embodiments, the UE 102 continues to measure physical layer metric values for the 4G LTE serving cell and when conditions improve, based at least in part on an evaluation of the physical layer metrics for the 4G LTE serving cell, the UE 102 re-registers with the IMS network element, if de-registered when detecting acceptable channel quality for the 4G LTE serving cell. In some embodiments, the UE 102 establishes and/or maintains data communication via the 4G LTE serving cell in parallel with voice communication via the 2G or 3G legacy neighbor cell.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to select a network mode for a mobile device, the method comprising:
by the mobile device:
in response to initiation of a voice connection, evaluating performance characteristics of a Lone Term Evolution (LTE) serving cell;
when the LTE serving cell is suitable for the voice connection based on the evaluation, establishing the voice connection as a Voice over LTE (VoLTE) connection via the LTE serving cell; and
when the LTE serving cell is not suitable for the voice connection:
deregistering from an Internet Protocol Multimedia Subsystem (IMS) network element or ignoring a message from the LTE serving cell to establish the voice connection; and establishing the voice connection via a neighbor cell, wherein the mobile device maintains existing data connections and/or establishes new data connections via the LTE serving cell in parallel with the voice connection via the neighbor cell.

2. The method of claim 1, wherein the LTE serving cell operates in accordance with an LTE radio access technology (RAT) and the neighbor cell operates in accordance with a legacy 3G or 2G RAT that is different from the LTE RAT of the LTE serving cell.

3. The method of claim 1, wherein the performance characteristics of the LTE serving cell comprise a reference signal receive power (RSRP), and suitability of the LTE serving cell for the voice connection is based at least in part on comparing the RSRP of the LTE serving cell to a threshold.

4. The method of claim 3, wherein the threshold exceeds a threshold specified by the LTE serving cell for reselection or handover.

5. The method of claim 1, wherein the neighbor cell operates in accordance with a code division multiple access (CDMA) 1× radio access technology (RAT).

6. The method of claim 1, wherein the initiation of the voice connection comprises a user input to the mobile device to establish the voice connection.

7. The method of claim 1, further comprising: by the mobile device:
when the LTE serving cell is not suitable for the voice connection and the initiation of the voice connection comprises receipt of the message from the LTE serving cell to establish the voice connection:
listening for a paging request from the neighbor cell, and
the establishing the voice connection via the neighbor cell occurs in response to receipt of the paging request from the neighbor cell.

8. The method of claim 1, wherein the neighbor cell operates in accordance with a code division multiple access (CDMA) 1× radio access technology (RAT).

9. The method of claim 1, wherein:
the performance characteristics comprise two or more of:
a signal power, a signal quality, an error rate, or a measure of loading of the LTE serving cell, and
the LTE serving cell is not suitable for the voice connection when at least two of the performance characteristics do not satisfy corresponding thresholds.

10. A wireless communication device comprising:
wireless circuitry;
one or more processors communicatively coupled to the wireless circuitry; and
a memory communicatively coupled to the one or more processors,
wherein the one or more processors are configured to execute computer-executable instructions stored within the memory to cause the wireless communication device to:
measure a reference signal received power (RSRP) of a serving cell and one or more neighbor cells;
in response to detecting a voice call initiation, compare the measured RSRP of the serving cell to a radio access technology (RAT) specific threshold, wherein the RAT specific threshold exceeds a threshold for reselection or handover specified by the serving cell;
when the RSRP of the serving cell equals or exceeds the RAT specific threshold, establish a voice connection via the serving cell; and
when the RSRP of the serving cell falls below the RAT specific threshold and a neighbor cell of the one or more neighbor cells satisfies a threshold for establishing the voice connection, establishing the voice connection via the neighbor cell,
wherein:
the wireless communication device maintains existing data connections and/or establishes new data connections via the serving cell in parallel with the voice connection via the neighbor cell, and
when the voice call initiation comprises a mobile-originated voice call, the wireless communication device deregisters from an Internet Protocol Multimedia Subsystem (IMS) network element before establishing the voice connection via the neighbor cell.

11. The wireless communication device of claim 10, wherein the wireless communication device is a multi-mode communication device that is capable of voice over LTE (VoLTE) communications with the serving cell and circuit-switched voice communications with the neighbor cell.

12. The wireless communication device of claim 10, wherein:
when the voice call initiation comprises a message from the serving cell indicating a request to establish the voice connection, the wireless communication device:
ignores the message from the serving cell,
listens for a paging request from the neighbor cell, and
establishes the voice connection via the neighbor cell in response to receipt of the paging request from the neighbor cell.

13. The wireless communication device of claim 10, wherein the serving cell operates in accordance with a Lone Term Evolution (LTE) wireless communication protocol, and the neighbor cell operates in accordance with a code division multiple access (CDMA) 1× wireless communication protocol.

14. A non-transitory computer-readable medium that stores instructions that, when executed by one or more processors, cause a wireless communication device to:
in response to initiation of a voice connection:
evaluate performance characteristics of a Lone Term Evolution (LTE) serving cell;
when the LTE serving cell is suitable for the voice connection based on the evaluation, establishing the voice connection as a Voice over LTE (VoLTE) connection via the LTE serving cell; and
when the LTE serving cell is not suitable for the voice connection:
deregistering from an Internet Protocol Multimedia Subsystem (IMS) network element, and
establishing the voice connection via a legacy 3G or 2G neighbor cell,
wherein the wireless communication device maintains existing data connections and/or establishes new data connections via the LTE serving cell in parallel with the voice connection via the legacy 3G or 2G neighbor cell.

15. The non-transitory computer-readable medium of claim 14, wherein the LTE serving cell is suitable for the voice connection when one or more performance characteristics of the LTE serving cell satisfy corresponding thresholds, wherein at least one threshold comprises an LTE-specific threshold that exceeds a threshold for reselection or handover specified by the LTE serving cell.

16. The non-transitory computer-readable medium of claim 14, wherein the legacy 3G or 2G neighbor cell operates in accordance with a code division multiple access (CDMA) 1× radio access technology (RAT).

17. The non-transitory computer-readable medium of claim 14, wherein the initiation of the voice connection comprises detecting a request to establish a mobile-originated voice call.

18. The non-transitory computer-readable medium of claim 14, wherein execution of the instructions further causes the wireless communication device to:
   periodically evaluate the performance characteristics of the LTE serving cell; and
   re-register with the IMS network element, when both the performance characteristics of the LTE serving cell indicate that the LTE serving cell is suitable for voice connections and the wireless communication device is not registered with the IMS network element.

* * * * *

UNITED STATES PATENT AND TRADEMARK OFFICE
CERTIFICATE OF CORRECTION

PATENT NO. : 9,706,448 B2  
APPLICATION NO. : 14/726346  
DATED : July 11, 2017  
INVENTOR(S) : Naik et al.

Page 1 of 1

It is certified that error appears in the above-identified patent and that said Letters Patent is hereby corrected as shown below:

In Claim 1, Column 18, Line 56: replace the term "Lone" with "Long"

In Claim 13, Column 20, Line 34: replace the term "Lone" with "Long"

In Claim 14, Column 20, Line 43: replace the term "Lone" with "Long"

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*